B. T. MILLS.
SPLIT WHEEL.
No. 184,540. Patented Nov. 21, 1876.
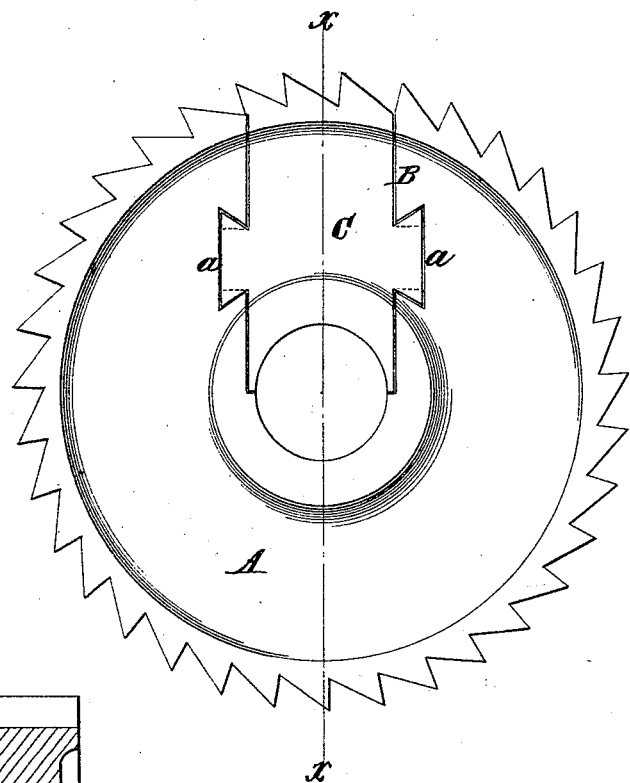
Fig. 1.
Fig. 2.
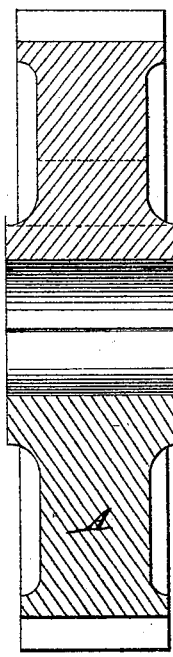
WITNESSES:
J. H. Scarborough
Gustave Dieterich
INVENTOR:
Benj. T. Mills.
BY
Munn & Co.
ATTORNEYS.

UNITED STATES PATENT OFFICE.

BENJAMIN T. MILLS, OF FALL RIVER, MASSACHUSETTS.

IMPROVEMENT IN SPLIT WHEELS.

Specification forming part of Letters Patent No. 184,540, dated November 21, 1876; application filed October 7, 1876.

*To all whom it may concern:*

Be it known that I, BENJAMIN T. MILLS, of Fall River, in the county of Bristol and State of Massachusetts, have invented a new and useful Improvement in Split Wheels, of which the following is a specification:

Figure 1 is a side elevation of my improved split wheel. Fig. 2 is a section on line $x\ x$ in Fig. 1.

Similar letters of reference indicate corresponding parts.

My invention consists in slotting or notching a wheel from the center to the circumference to admit of placing it upon the shaft, and in cutting a dovetailed groove in each side of the notch thus formed, and in a section of a wheel made to fit the said notch and dovetailed grooves.

The object of the invention is to furnish a wheel that may be applied to or removed from shafts where it would be inconvenient or impossible to place a wheel of ordinary construction.

A is a wheel having a slot or notch, B, cut from the center of the bore to the periphery, in the sides of which the dovetailed grooves $a$ are cut. C is a section of a wheel, which is of the required form to fill the notch B and dovetailed grooves $a$, and completes the wheel. This section is driven into the wheel sidewise, and is retained in place by the pressure of the key upon the opposite side of the shaft, and is capable of resisting the strain produced by driving the key, and of holding the wheel against the expanding effect of the key. The dovetailed grooves may be made straight, as shown in dotted lines in Fig. 1, if desired.

The advantage claimed for my improved wheel is, that it can be placed on a shaft without removing it from its place, and without removing anything that may be carried by the shaft. Its peculiar construction makes it nearly or quite as strong as a solid wheel of the same proportions. It is perfectly balanced, and does away with flanges and other attachments to the side of the wheel for retaining the removable part.

If desired, the notch in the wheel and the removable part of the wheel may be widest at their inner end, forming a dovetail, which will assist in holding the removable part in place.

Having thus described my invention, I claim as new and desire to secure by Letters Patent—

A split wheel, composed of the part A, having the notch B, in the sides of which notch the dovetailed grooves $a$ are made, and the part C, which is formed to fit the said notch and dovetailed grooves, and complete the wheel, substantially as herein shown and described.

BENJAMIN T. MILLS.

Witnesses:
F. T. HATHAWAY,
GEORGE E. BAMFORD.